(12) United States Patent
Mendez

(10) Patent No.: US 7,770,919 B2
(45) Date of Patent: Aug. 10, 2010

(54) SIDE CURTAIN AIRBAG

(75) Inventor: Gerardo Mendez, Rochester, MI (US)

(73) Assignee: TK Holdings Inc., Auburn Hills, MI (US)

( * ) Notice: Subject to any disclaimer, the term of this patent is extended or adjusted under 35 U.S.C. 154(b) by 10 days.

(21) Appl. No.: 12/216,912

(22) Filed: Jul. 11, 2008

(65) Prior Publication Data

US 2010/0007121 A1 Jan. 14, 2010

(51) Int. Cl.
B60R 21/16 (2006.01)
(52) U.S. Cl. .................................. 280/730.2
(58) Field of Classification Search .............. 280/728.2, 280/730.1, 730.2, 743.1
See application file for complete search history.

(56) References Cited

U.S. PATENT DOCUMENTS

| | | | |
|---|---|---|---|
| 5,884,937 A | 3/1999 | Yamada | |
| 5,884,939 A * | 3/1999 | Yamaji et al. | 280/743.1 |
| 6,110,094 A | 8/2000 | Wallentin et al. | |
| 6,371,512 B1 * | 4/2002 | Asano et al. | 280/730.2 |
| 6,575,496 B2 | 6/2003 | Hess et al. | |
| 6,626,456 B2 * | 9/2003 | Terbu et al. | 280/728.2 |
| 6,644,687 B2 * | 11/2003 | Saito et al. | 280/730.2 |
| 6,758,490 B2 | 7/2004 | Hoeft et al. | |
| 6,851,707 B2 | 2/2005 | Bakhsh et al. | |
| 2001/0000290 A1 | 4/2001 | Nakajima et al. | |
| 2002/0036395 A1 | 3/2002 | Bakhsh et al. | |
| 2002/0096864 A1 | 7/2002 | Asano et al. | |
| 2002/0158450 A1 * | 10/2002 | Hoeft et al. | 280/730.2 |
| 2002/0158451 A1 * | 10/2002 | Nusshor | 280/730.2 |
| 2002/0175503 A1 | 11/2002 | Hess et al. | |
| 2002/0195803 A1 | 12/2002 | Terbu et al. | |
| 2003/0116947 A1 * | 6/2003 | Yokoyama et al. | 280/730.2 |
| 2004/0075256 A1 | 4/2004 | Klaiber et al. | |
| 2004/0164530 A1 | 8/2004 | Sunabashiri | |
| 2005/0062267 A1 | 3/2005 | Recker et al. | |
| 2005/0110256 A1 | 5/2005 | Crookston et al. | |
| 2005/0242551 A1 | 11/2005 | Noguchi et al. | |
| 2007/0013173 A1 * | 1/2007 | Kino et al. | 280/729 |
| 2007/0126221 A1 * | 6/2007 | Yoshida | 280/743.1 |
| 2007/0182142 A1 * | 8/2007 | Schimpff et al. | 280/743.1 |

FOREIGN PATENT DOCUMENTS

JP 2005-313777 11/2005

* cited by examiner

Primary Examiner—Paul N Dickson
Assistant Examiner—Robert A Coker
(74) Attorney, Agent, or Firm—Foley & Lardner LLP

(57) ABSTRACT

A module comprising a packaged airbag, wherein the airbag is configured to deploy on an interior side of a vehicle in a curtain arrangement; wherein the airbag is packaged so that the bottom of the airbag is folded then rolled in an outboard direction; and wherein the packaged airbag includes a folded portion located above the outboard rolled portion; and wherein the top portion is folded along a longitudinally extending crease to create a folded section located adjacent and outboard the rolled and folded sections. A module further comprising a Z-shaped folded portion above the outboard rolled portion, a second fold of the bottom portion in the outboard direction, a Z-shaped fold located between the bottom and top portions of the airbag, an inflator system, a plurality of mounting straps, and at least one tether on each of the fore and aft ends of the module.

16 Claims, 5 Drawing Sheets

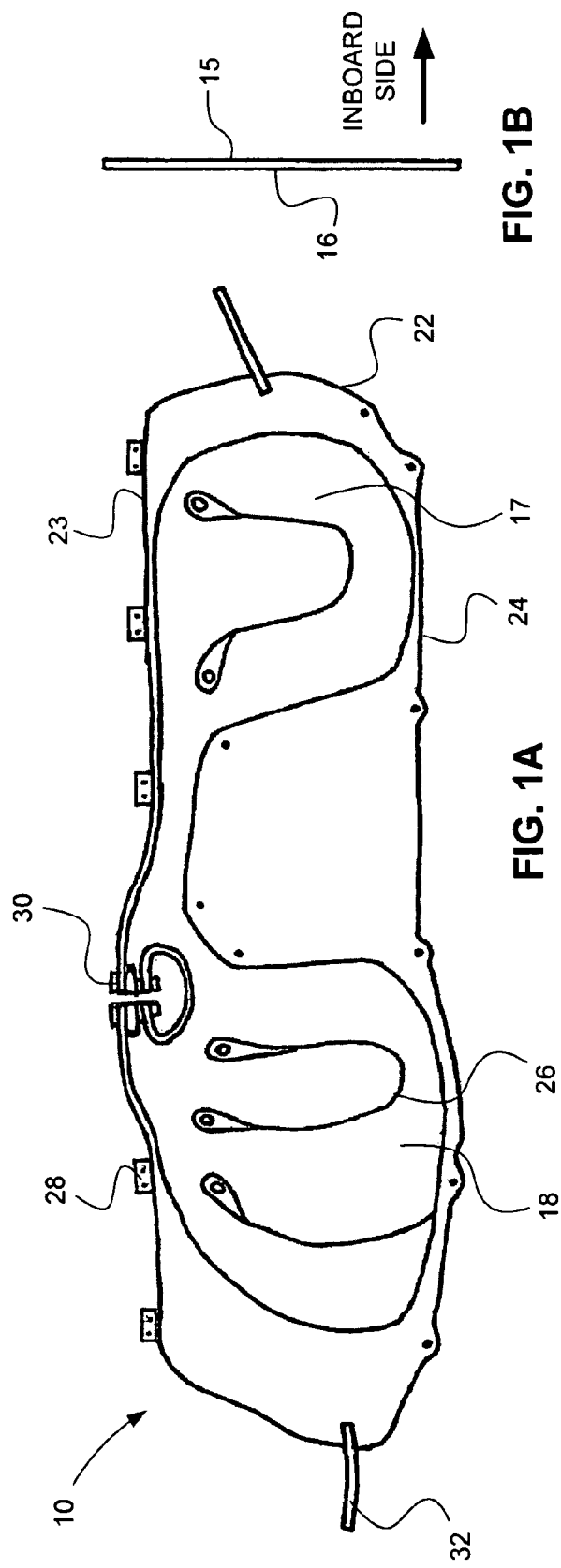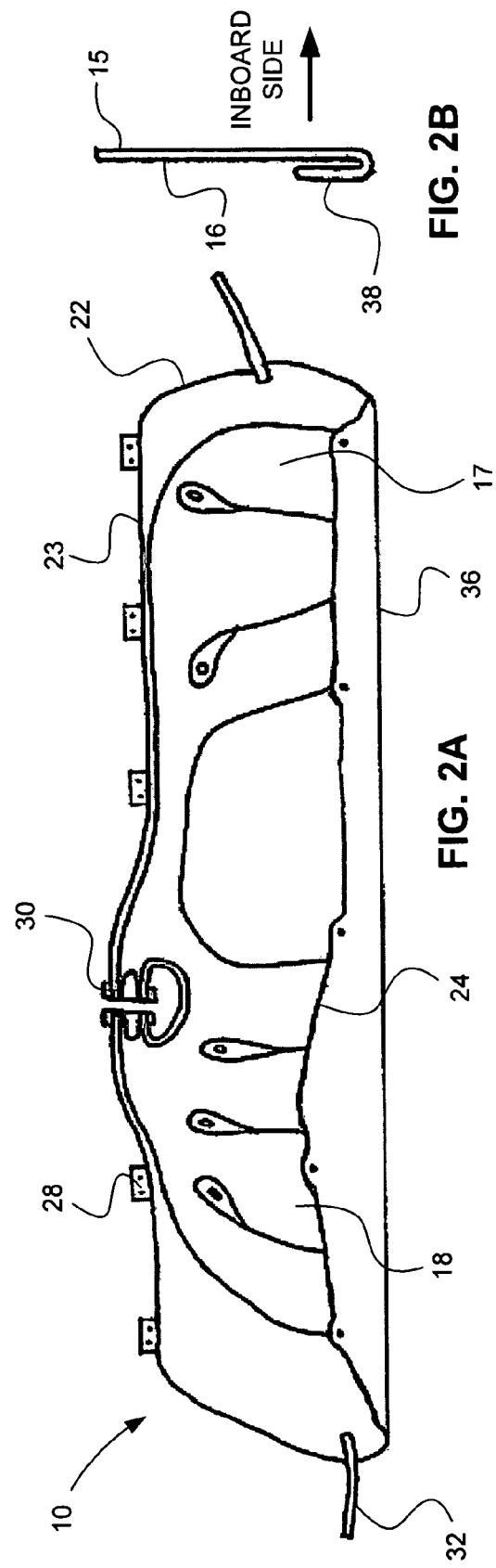

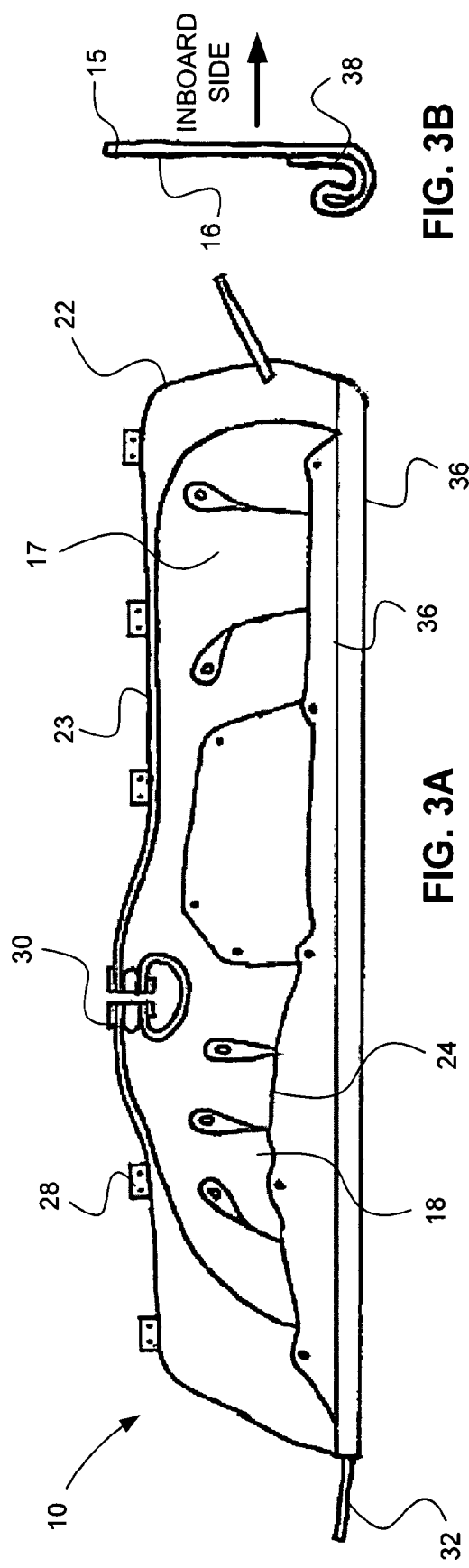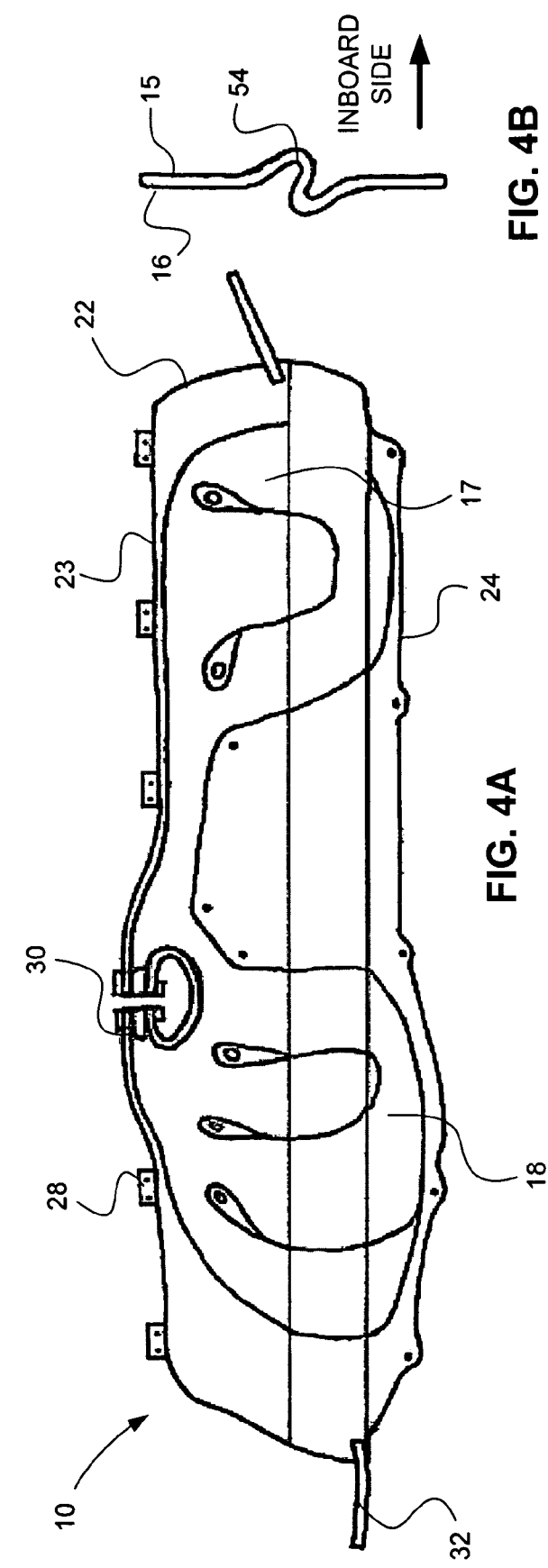

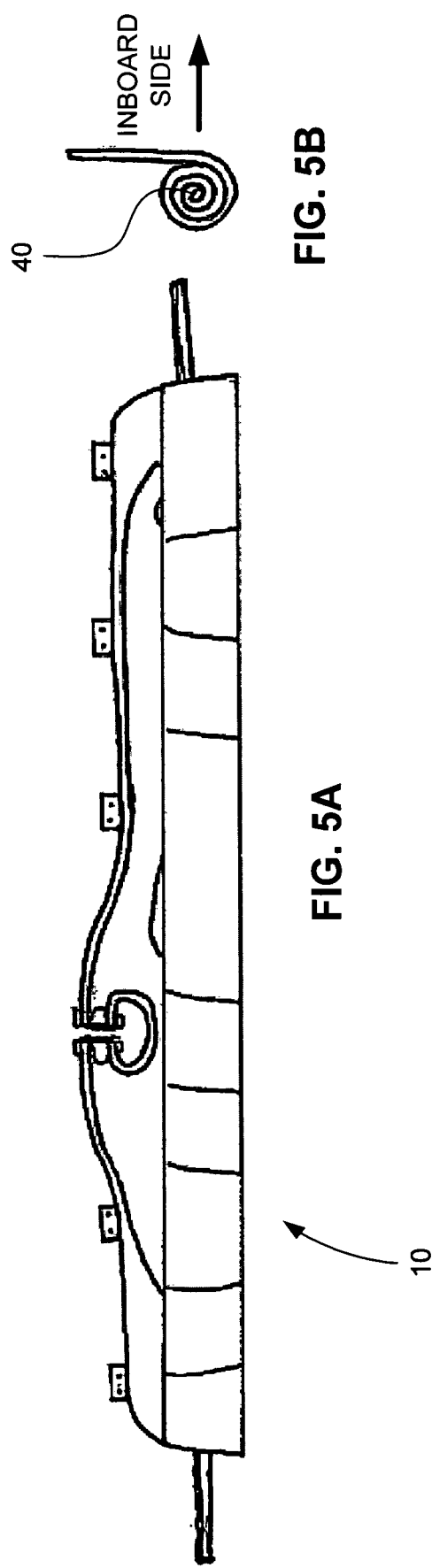
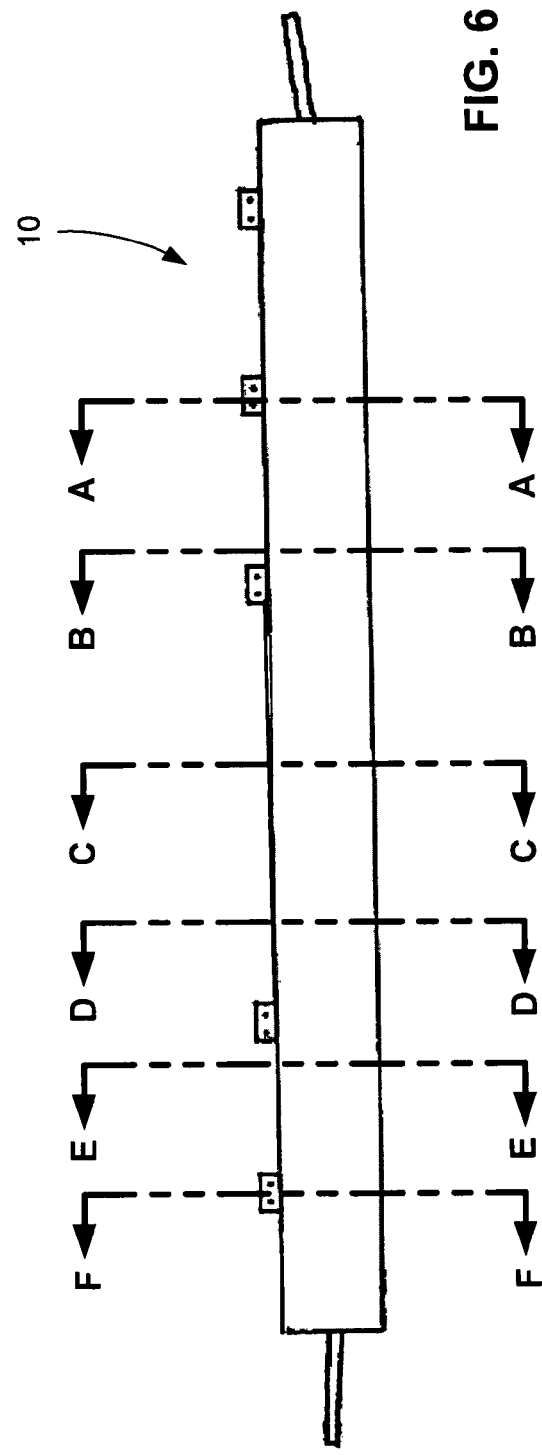

SIDE CURTAIN AIRBAG

BACKGROUND

The present disclosure relates generally to the field of vehicle airbags which provide occupant protection when deployed (e.g., during a dynamic vehicle impact). More particularly, the present disclosure relates to a method for packaging (i.e., folding and rolling) and storing a side curtain airbag in a vehicle for future deployment.

Airbags are located in vehicles to help protect occupants from injury during a dynamic vehicle impact event. A side curtain airbag can deploy and inflate, through the use of an inflator that provides gas for inflating the airbag. The inflator may use an explosive charge which causes gas to rapidly enter the inflatable regions of an airbag, to help protect at least one occupant from injury during a dynamic side-impact event. A side curtain airbag is generally stored within and deployed from the roof rail, which is the portion of a vehicle located just above the vehicle door frame and below the vehicle roof. Side curtain airbags are typically packaged through a process of folding and rolling to compact the airbag in order for it to fit within the small cross-section of the vehicle roof rail, and then after installation into the vehicle are hid behind a roof liner or headliner to improve the vehicle aesthetics. Side curtain airbags can be placed in any seat row (e.g., first, second, third) of a vehicle to deploy and to provide protection for any outboard vehicle occupant, and often a single side curtain airbag may protect multiple occupants in different seat rows.

It has been known to package side curtain airbags utilizing multiple step methods. One such method, first, folds the bottom portion of the airbag, in the inboard direction, onto itself (to form a closed U-shape); second, rolls the folded portion in the inboard direction; and third, pleats the top portion of the airbag with two Z-shaped folds. Another method, first, folds the bottom portion of the airbag, in the outboard direction, onto itself (to form a closed J-shaped fold); second, folds the J-shaped fold onto itself in the outboard direction, third rolls the airbag in the outboard direction; and fourth, pleats the top portion of the airbag with two Z-shaped folds.

These traditional airbag designs incorporate the same packaging method (i.e., the same steps of folding and rolling) along the entire length of the airbag. This means that the traditional airbag designs utilize the same packaging method to protect multiple occupants, although the interior compartment of each seat row is different. Conventional airbag designs deploy in a common trajectory for different occupants although the environment for each occupant may dictate the need to deploy along different trajectories to provide optimal protection to each occupant. Therefore it would be desirable to have a method to package an airbag which utilizes different methods for different sections of the airbag, to maximize the protection of each occupant. It would be desirable to design the deployment trajectory independently for each occupant to take into consideration the differences in the design of the window, door, pillar, and seat, as well as other vehicle components.

SUMMARY

One embodiment of the application relates to the packaging of a side curtain airbag module. The exemplary side curtain airbag module comprises a packaged airbag, so that the bottom of the airbag is folded then rolled in an outboard direction; and wherein the packaged airbag includes a folded portion located above the outboard rolled portion; and wherein the top portion is folded along a longitudinally extending crease to create a folded section located adjacent and outboard the rolled and folded sections. The first exemplary side curtain airbag module may further comprise a Z-shaped folded portion above the outboard rolled portion, a second fold of the bottom portion in the outboard direction, a Z-shaped fold located between the bottom and top portions of the airbag, an inflator system to provide the explosive charge of gas that fills and expands the airbag, a plurality of mounting straps to provide a method of attaching the module to a vehicle and at least one tether on each of the fore and aft ends of the module to provide stability during deployment of the airbag.

A second embodiment of the application relates to the packaging of a side curtain airbag module. The exemplary side curtain airbag module comprises a packaged airbag, wherein the airbag has a first portion located aft of the vehicle B-pillar and a second portion located forward of a the B-pillar; wherein the first portion is packaged so that the bottom of the first portion airbag is folded then rolled in an outboard direction, and wherein the packaged first portion of the airbag includes a folded portion located above the outboard rolled portion; and wherein the second portion is packaged so that that the bottom of the second portion airbag is folded then rolled in an outboard direction and wherein the packaged second portion of the airbag includes a folded portion located above the outboard rolled portion; and wherein the top portion of the second portion is folded along a longitudinally extending crease to create a folded section located adjacent and outboard the folded and rolled sections. The second exemplary side curtain airbag module may further comprise of a Z-shaped folded portion above the outboard rolled portion of the first portion of the airbag, a Z-shaped folded portion above the outboard rolled portion of the second portion of the airbag, a second fold of the bottom portion in the outboard direction, a Z-shaped fold located between the bottom and top portions of the airbag, an inflator system, a plurality of mounting straps, and at least one tether on each of the fore and aft ends of the module.

This application also relates a method of packaging a side curtain airbag comprising the steps of; rolling the lower portion of the airbag in an outboard direction, and folding a portion of the airbag above the outboard roll to include an additional fold located adjacent and outboard the rolled section. This method of packaging a side curtain airbag may further comprise folding the bottom section of the airbag in the outboard direction to form a J-shape and a second fold of the bottom section of the airbag in the outboard direction to form a J-shape.

It is to be understood that both the foregoing general description and the following detailed description are exemplary and explanatory only, and are not restrictive of the invention as claimed.

BRIEF DESCRIPTION OF THE DRAWINGS

FIG. 1A is a cross-car (side) view of the outboard side of an exemplary embodiment of a side curtain airbag in the unpackaged (unfolded and unrolled) state.

FIG. 1B is a rear view of the side curtain airbag of FIG. 1A according to an exemplary embodiment.

FIG. 2A is a cross-car (side) view the outboard side of an exemplary embodiment of a side curtain airbag showing an initial outboard J-shaped fold.

FIG. 2B is a rear view of the side curtain airbag of FIG. 2A according to an exemplary embodiment.

FIG. 3A is a cross-car (side) view of the outboard side of an exemplary embodiment of a side curtain airbag showing a first outboard J-shaped fold followed by a second outboard J-shaped fold.

FIG. 3B is a rear view of the side curtain airbag of FIG. 3A according to an exemplary embodiment.

FIG. 4A is a cross-car (side) view of the outboard side of an exemplary embodiment of a side curtain airbag showing a mid airbag Z-shaped fold.

FIG. 4B is a rear view of the side curtain airbag of FIG. 4A according to an exemplary embodiment.

FIG. 5A is a cross-car (side) view of the outboard side of an exemplary embodiment of a side curtain airbag showing an outboard roll.

FIG. 5B is a rear view of the side curtain airbag of FIG. 5A according to an exemplary embodiment.

FIG. 6 is a cross-car (side) view of the outboard side of an exemplary embodiment of a side curtain airbag shown in the packaged state and ready for installation into a vehicle.

DESCRIPTION

Figure 7C:
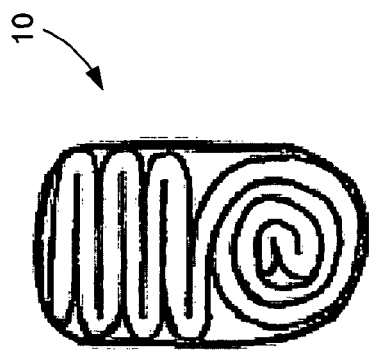
FIG. 7C is a rear view along section C-C of the side curtain airbag of FIG. 6 according to an exemplary embodiment.

Side curtain airbags are provided in vehicles to help protect an occupant from injury during a dynamic side-impact event. It is desirable for the side curtain airbag's trajectory during deployment to place the airbag cushion between the vehicle occupant and the vehicle's structure (which includes the window, the door frame and the pillars) to provide protection to the occupants during the impact event. The method of packaging (i.e., folding and rolling) the side curtain airbag for storage until deployment is critical to the trajectory path of the airbag during deployment.

Referring generally to the FIGURES, a side curtain airbag module 10 is shown according to an exemplary embodiment. Airbag module 10 remains packaged and stored in a portion of the vehicle, typically the roof rail, until deployment occurs. An airbag module 10 includes an inflator system 30 which provides inflation gas for the airbag. The inflator may use store gas or gas generant (or a combination) to provide inflation gas for the airbag. The inflator may include an explosive charge that causing the gas to rapidly enter and expand the inflatable regions of the airbag, causing the airbag to breach the surrounding flexible skin in order to deploy to protect the occupant. During deployment, airbag module 10 remains attached to the vehicle by a plurality of mounting straps 28 which protrude from the top edge 23 of airbag module 10, causing airbag cushion 22 to expand in the downward and cross-car directions as the first and second portions 17 and 18, respectively, are filled with gas.

Referring to FIGS. 1A and 1B, an exemplary embodiment of a side-curtain airbag module 10 is shown in the unpackaged state, and includes an airbag cushion 22, at least one seam 26, a plurality of mounting straps 28, an inflator system 30, and at least one tether 32 on each end of the airbag module 10, which attach directly to the vehicle. An exemplary airbag cushion 22 may include an inboard side 15, which faces the passenger of the vehicle; coupled (through conventional means) to an outboard side 16, which faces the door of the vehicle; which form a top edge 23 and a bottom edge 24. An exemplary air bag cushion 22 also includes a first portion 17, which when inflated, protects a rearward positioned occupant; and a second portion 18, which when inflated, protects a forward positioned occupant.

Referring to FIGS. 2A and 2B, a first exemplary embodiment of a side-curtain airbag module 10 is shown with the bottom edge 24 folded upward onto the outboard side 16 towards the top edge 23, to form a J-shaped fold 38 with a crease 36 along the bottom. An alternative embodiment of airbag module 10 may fold the bottom edge 24 upward onto the inboard side 15 towards the top edge 23.

Referring to FIGS. 5A and 5B, a first exemplary airbag module 10 (from FIGS. 2A and 2B) is shown, where beginning with the crease 36 (of FIG. 2A) the fold 38 (of FIG. 2B) is rolled towards the top edge 23 on the outboard side, which forms roll 40. An alternative embodiment of airbag module 10 may roll the fold 38 towards the top edge 23 on the inboard side.

Figure 7F:
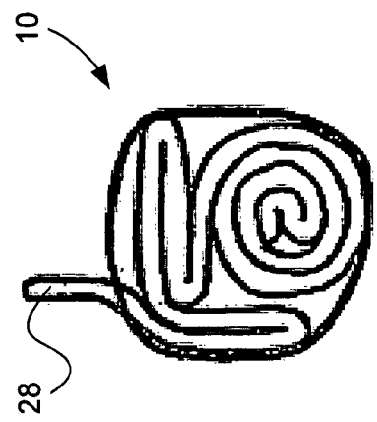
FIG. 7F is a rear view along section F-F of the side curtain airbag of FIG. 6 according to an exemplary embodiment.

Referring to FIGS. 6 thru 7F, a first exemplary airbag module 10 (from FIGS. 2A and 2B) is shown. The portion of airbag above the roll 40 of the second portion 18 of the first exemplary airbag module 10 is folded into a Z-shaped fold 54 which rests above roll 40 (as shown in FIGS. 7D thru 7F). The remaining material of the second portion 18 of airbag module 10, above the Z-shaped fold 54, is folded along a longitudinally extending crease to create a folded section 56 located adjacent and outboard of the Z-shaped fold 54 and roll 40. The portion of airbag above the roll 40 of the first portion 17 of the first exemplary airbag module 10 is folded into a first Z-shaped fold 54 which rests above roll 40 (as shown in FIGS. 7A thru 7C). The remaining material of the first portion 17 of airbag module 10, above the Z-shaped fold 54, is folded into a second Z-shaped fold 54 which rests above the first Z-shaped fold 54.

Also referring to FIGS. 6 thru 7F, a first exemplary airbag module 10 is wrapped in a skin 60, which is both flexible and non-structural, as it maintains the packaged shape of airbag module 10. During deployment, airbag module 10 breaches the skin 60 while expanding to take its design intent inflated shape. The plurality of mounting straps 28 protrude through the skin 60, to provide a means of attaching airbag module 10 to the vehicle, as shown in FIGS. 7A and 7F.

Figure 7B:
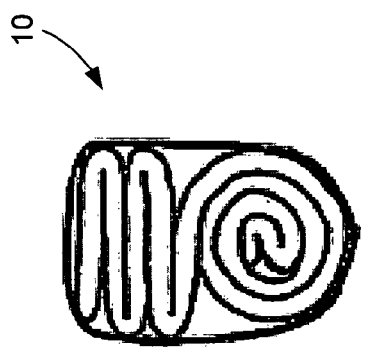
FIG. 7B is a rear view along section B-B of the side curtain airbag of FIG. 6 according to an exemplary embodiment.
Figure 7E:
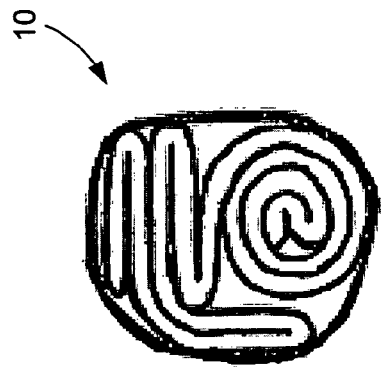
FIG. 7E is a rear view along section E-E of the side curtain airbag of FIG. 6 according to an exemplary embodiment.
Figure 7A:
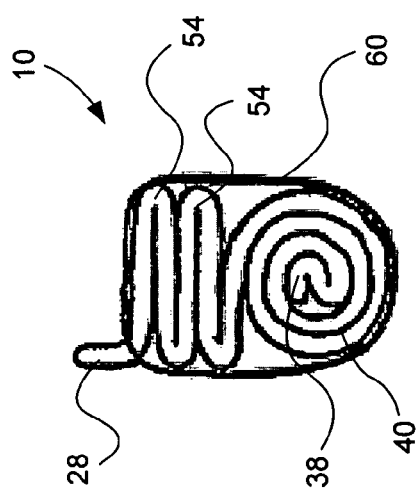
FIG. 7A is a rear view along section A-A of the side curtain airbag of FIG. 6 according to an exemplary embodiment.
Figure 7D:
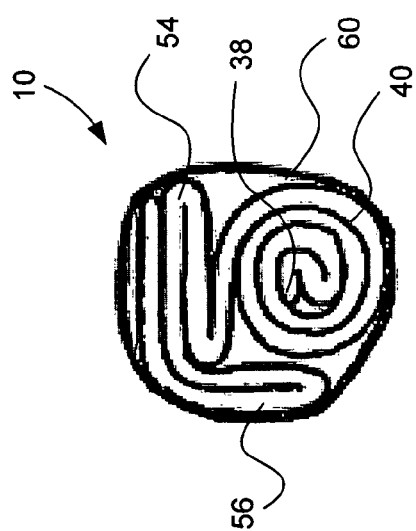
FIG. 7D is a rear view along section D-D of the side curtain airbag of FIG. 6 according to an exemplary embodiment.

Referring to FIGS. 3A and 3B, a second exemplary embodiment of a side curtain air bag module 10 is shown with the bottom edge 24 folded upward onto the outboard side 16 towards the top edge 23, to form a J-shaped fold 38 with a crease 36 on the bottom. The J-shaped fold 38 is then folded upwards toward the top edge 23, to form a second J-shaped fold 38 and a second crease 36 along the now bottom edge of the second exemplary airbag module 10. The second crease 36 of the second J-shaped fold 38 of the second exemplary airbag module 10 is rolled towards the top edge 23 on the outboard side, which forms roll 40, as shown in FIGS. 5A and 5B. The second portion 18 of the second exemplary airbag module 10 is folded into a Z-shaped fold 54, which rests above roll 40, then the remaining material is folded along a longitudinally extending crease to create a folded section 56 located adjacent and outboard of the Z-shaped fold 54 and roll 40, as shown in FIGS. 7D thru 7F. The first portion 17 of the second exemplary airbag module 10 is folded into a first and second Z-shaped fold 54, which rests above roll 40, as shown in FIGS. 7A thru 7C.

Also referring to FIGS. 3A and 3B, an alternative embodiment of the second exemplary embodiment of airbag module 10 may involve the first and second folds 38 being folded onto the inboard side 15, towards the top edge 23. Another alternative embodiment of the second exemplary embodiment of the airbag module 10 may involve rolling the first and second folds 38 towards the top edge 23 on the inboard side, which forms roll 40.

Referring to FIGS. 4A and 4B, a third exemplary embodiment of a side curtain air bag module 10 is shown. In between the bottom edge 24 and the top edge 23, a section of the airbag module 10 is folded into a Z-shaped fold 54. The bottom edge 24 of the second exemplary airbag module 10 is rolled towards the top edge 23 on the outboard side, which forms roll 40, as shown in FIGS. 5A and 5B. The second portion 18 of the second exemplary airbag module 10 is folded into a Z-shaped fold 54, which rests above roll 40, then the remaining material is folded along a longitudinally extending crease to create a folded section 56 located adjacent and outboard of the Z-shaped fold 54 and roll 40, as shown in FIGS. 7D thru 7F. The first portion 17 of the second exemplary airbag module 10 is folded into a first and second Z-shaped fold 54, which rests above roll 40, as shown in FIGS. 7A thru 7C.

Also referring to FIGS. 4A and 4B, an alternative embodiment of the third exemplary embodiment may include adding a J-shaped fold 38 (as shown in FIGS. 2A and 2B) to the bottom of the airbag module 10. The airbag module 10 may then be rolled beginning with the crease 36 through the Z-shaped fold.

Figure 8:
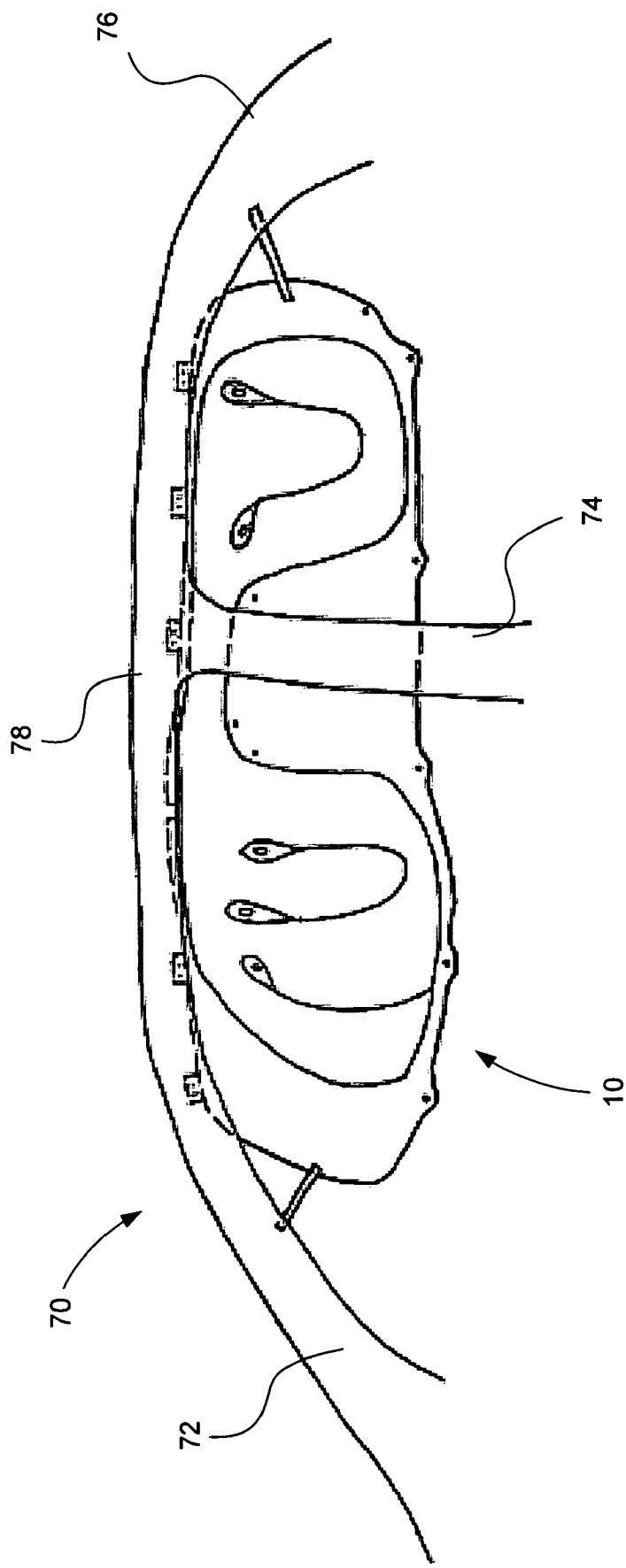
FIG. 8 is a cross-car (side) view of the outboard side of an exemplary embodiment of a side curtain airbag in the unpackaged (unfolded and unrolled) in relation to an exemplary vehicle embodiment.

Referring to FIG. 8, an exemplary embodiment of a side-curtain airbag module 10 is shown in relation to an exemplary embodiment of a vehicle 70, which includes an A-pillar 72, a B-pillar, 74, a C-pillar 76, and a roof rail 78. A roof rail 78 spans between the A-pillar 72 and the C-pillar 76, and is where an exemplary side curtain airbag 10 is stored when packaged until deployment. A side curtain airbag 10 may be attached to a roof rail 78 through the use of the mounting straps 28.

It is important to note that the construction and arrangement of the side curtain airbag folding method as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A module comprising a packaged airbag, wherein the airbag is configured to deploy on an interior side of a vehicle in a curtain arrangement;

wherein the airbag is packaged so that a bottom portion of the airbag is folded then rolled in an outboard direction to form an outboard rolled portion; and wherein the packaged airbag includes a folded portion located above the outboard rolled portion; and wherein a top portion of the airbag is folded along a longitudinally extending crease to create a folded section located adjacent and outboard the rolled and folded portions.

2. A module of claim 1, wherein the folded portion is Z-shaped.

3. A module of claim 1, further comprising a second fold of the bottom portion of the airbag in the outboard direction.

4. A module of claim 1, further comprising a Z-shaped fold located between the bottom and top portions of the airbag.

5. A module of claim 1, further comprising an inflator system to provide the gas for expanding the airbag.

6. A module of claim 1, further comprising a plurality of mounting straps to provide a method of attaching the module to a vehicle.

7. A module of claim 1, further comprising at least one tether on each of the fore and aft ends of the module to provide stability during deployment of the airbag.

8. A module of claim 1, wherein the airbag includes a first portion located aft of a vehicle B-pillar and a second portion located forward of the B-pillar; and wherein the top portion only of the second portion of the airbag is folded along a longitudinally extending crease to create a folded section located adjacent and outboard the rolled and folded portions.

9. A module comprising a packaged airbag, wherein the airbag is configured to deploy on an interior side of a vehicle in a curtain arrangement;

wherein the airbag has a first portion located aft of a vehicle B-pillar and a second portion located forward of the B-pillar;

wherein the first portion is packaged so that a bottom portion of the first portion of the airbag is folded then rolled in an outboard direction to form an outboard rolled portion of the first portion, and wherein the packaged first portion of the airbag includes a folded portion located above the outboard rolled portion of the first portion; and wherein the second portion is packaged so that a bottom portion of the second portion of the airbag is folded and then rolled in an outboard direction to form an outboard rolled portion of the second portion and wherein the packaged second portion of the airbag includes a folded portion located above the outboard rolled portion of the second portion; and wherein a top portion of the second portion of the airbag is folded along a longitudinally extending crease to create a folded section located adjacent and outboard the folded and rolled portions of the second portion.

10. A module of claim 9, wherein the folded portion above the outboard rolled portion of the first portion of the airbag includes a Z-shaped fold.

11. A module of claim 9, wherein the folded portion above the outboard rolled portion of the second portion of the airbag includes a Z-shaped fold.

12. A module of claim 9, further comprising a second fold of the bottom portion of the first portion of the airbag in the outboard direction.

13. A module of claim 9, further comprising a Z-shaped fold located between the bottom and top portions of the airbag.

14. A module of claim 9, further comprising an inflator system to provide the gas for expanding the airbag.

15. A module of claim 9, further comprising a plurality of mounting straps to provide a method of attaching the module to a vehicle.

16. A module of claim 9, further comprising at least one tether on each of the fore and aft ends of the module to provide stability during deployment of the airbag.

* * * * *